United States Patent [19]

Lapham

[11] 4,037,292
[45] July 26, 1977

[54] UNIVERSAL STEM FOR A CARPET CASTER

[76] Inventor: Sidney D. Lapham, 2324 Tice Creek Drive Manor No. 3, Walnut Creek, Calif. 94595

[21] Appl. No.: 623,678

[22] Filed: Oct. 20, 1975

Related U.S. Application Data

[62] Division of Ser. No. 502,180, Aug. 30, 1974, Pat. No. 3,984,724.

[51] Int. Cl.² ............................................. B60B 33/00
[52] U.S. Cl. ........................................... 16/38; 16/39
[58] Field of Search ................................ 16/37, 38, 39

[56] References Cited

U.S. PATENT DOCUMENTS

| 1,848,347 | 3/1932 | Jarvis ........................................ 16/39 |
| 2,416,532 | 2/1947 | Nalle ........................................ 16/39 |
| 3,197,802 | 8/1965 | Fontana et al. ........................... 16/38 |

FOREIGN PATENT DOCUMENTS

| 157,345 | 6/1954 | Australia ..................................... 16/38 |
| 40,114 | 6/1968 | Finland ....................................... 16/38 |
| 1,185,963 | 2/1959 | France ........................................ 16/37 |
| 19,503 | 9/1899 | United Kingdom ...................... 16/38 |

Primary Examiner—Werner H. Schroeder
Assistant Examiner—Conrad L. Berman
Attorney, Agent, or Firm—Phillips, Moore, Weissenberger, Lempio & Majestic

[57] ABSTRACT

A self-tracking carpet caster of the inclined-disc type is disclosed, and the geometric relationships of its components and angles of inclination for optimum operation are defined. Lint protection means including a flexible sealing skirt and a grooved track construction are described, as in an improved locking structure and a simple interchangeable stem assembly construction which permits inexpensive adaptation of the caster to a wide variety of replacement uses.

4 Claims, 12 Drawing Figures

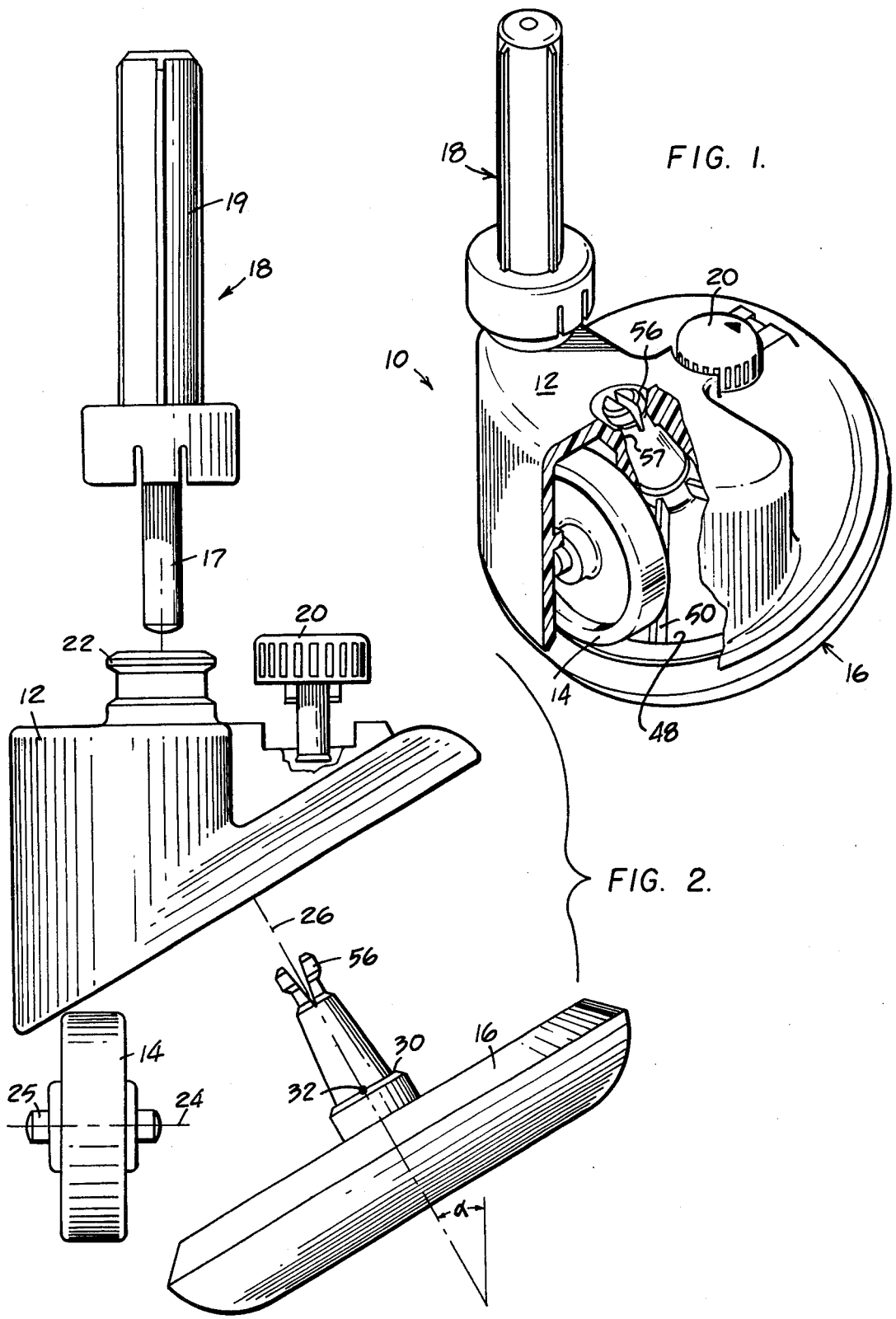

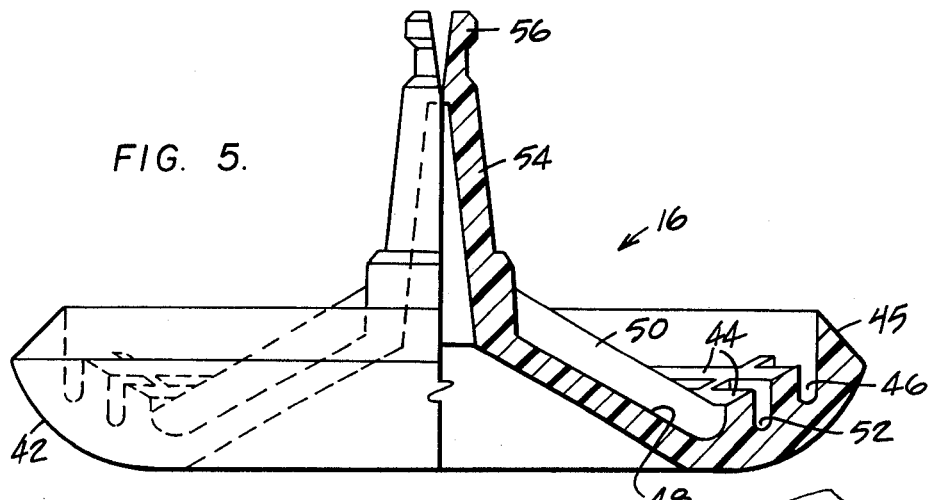
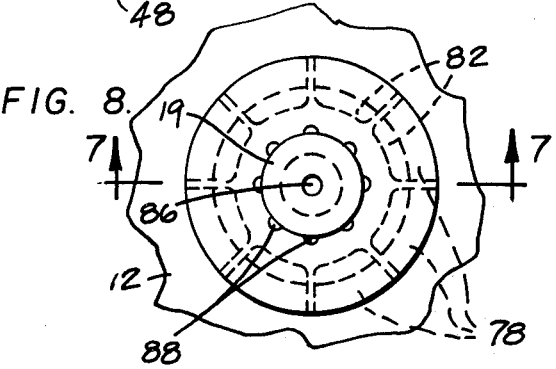
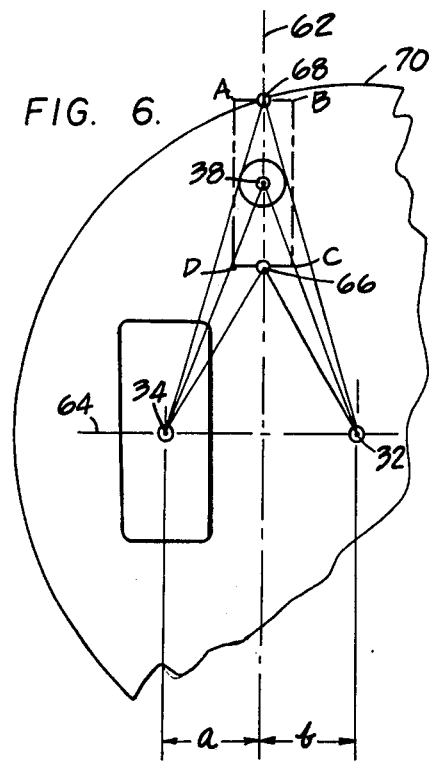
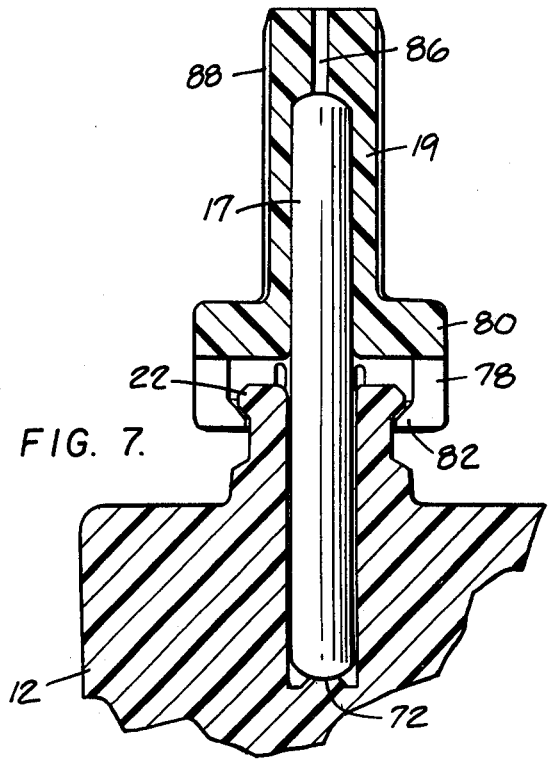

UNIVERSAL STEM FOR A CARPET CASTER

This is a division, of Ser. No. 502,180, filed Aug. 30, 1974 now U.S. Pat. No. 3,984,724.

BACKGROUND OF THE INVENTION

U.S. Pat. No. 2,810,151 shows a caster composed essentially of three elements: a bearing block arranged to swivel eccentrically about a vertical axis; a wheel or roller arranged to turn on a horizontal axis; and a dished disc journaled on an inclined axis and arranged to provide, on its inner surface, a track on which the wheel rolls while the outer surface of the disc rolls on the ground.

As stated in U.S. Pat. No. 2,810,151, these casters were originally intended to use on dollies in refrigerator cars and cold storage rooms where their resistance to becoming caught in holes or between floor slats was thought to be useful. However, the prototypes of the casters made according to U.S. Pat. No. 2,810,151 failed to track or caster properly, as the importance of the geometric relationships disclosed herein were not then understood. When trial-and-error experimentation failed to produce acceptable results, the caster of U.S. Pat. No. 2,810,151 was shelved as impractical.

Not until recently, therefore, was further research undertaken in order to use this type of caster to solve a quite different problem: the moving of furniture on carpets, particularly on the deep-pile carpeting which is coming into increasing use in hotels and other commercial facilities as well as in homes. The present invention is directed to those geometric relationships of the caster design and to those configurations which allow the caster to maintain optimum tracking ability while solving the particular problems involved in the use of casters on carpeting as hereinafter described.

SUMMARY OF THIS INVENTION

The present invention defines the specific angles of inclination which the dished disc of the caster should have for various types of furniture and defines the specific geometric relationship which must exist between the location of the stem axis, the wheel center and the bearing point of the dished disc in the light of the specific angles of inclnation used for the caster to properly roll instead of drag on the carpet surface. The present invention also defines the optimum ranges of the rather critical angle of inclination of the dished disc for various types of furniture, as hereinafter described.

In addition, the invention provides a narrow wheel track bordered by lint-collecting grooves and protected, if desired, by a flexible sealing skirt to prevent interference of lint with the function of the caster, and it provides a construction for the rapid interchangeability of various types of stems so that the same basic caster may be used as a replacement part for any type of existing caster.

It is therefore the object of this invention to define constructional relationships which permit a caster of the type described to be successfully used as a carpet caster.

It is a further object of the invention to define the optimum angles of inclination of the dished disc for various types of furniture.

It is a still further object of the invention to provide a carpet caster of the type described which is resistant to lint interference.

It is another object of the invention to provide a caster of the type described which is readily adaptable to various shapes and size of stem sockets.

BRIEF DESCRIPTION OF THE DRAWINGS

FIG. 1 is a perspective view, partly broken away, of the caster of this invention;

FIG. 2 is an exploded side view of the caster of this invention;

FIG. 5 is a vertical half-section of the dished disc used in the caster of this invention;

FIG. 6 is a schematic diagram illustrating the geometric relationships involved in the invention;

FIG. 7 is a vertical sectional view of one preferred type of stem assembly along line 7—7 of FIG. 8;

FIG. 8 is a plan view of the stem assembly of FIG. 7;

DESCRIPTION OF THE PREFERRED EMBODIMENT

Figure 3A:
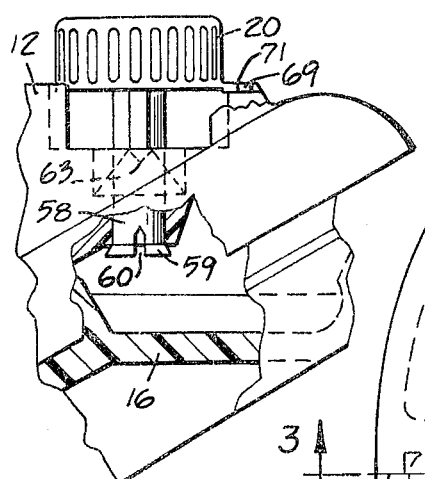
FIG. 3a is a fragmentary view similar to FIG. 3 but showing the locking pin in the unlocked position.

The caster of this invention is generally shown at 10 in FIG. 1. As best shown in the exploded view of FIG. 2, it consists of four essential parts: the body or bearing block 12, the roller or wheel 14, the dished disc 16 and the stem assembly 18 consisting of a pin 17 and a cap 19. In addition, the caster may be provided with a locking member 20 whose function will be hereinafter explained.

In the preferred embodiment, the stem assembly 18 is rotatable about the collar 22 of the body 12, the roller 14 is rotatable about a horizontal axis 24 on bearing pin 25, and the dished disc 16 is rotatable about an inclined axis 26 on the snap collar 56 which fits into an appropriate recess in the body 12.

The angle $\alpha$ formed between the axis 26 and the vertical is referred to hereinafter as the angle of inclination of the dished disc 16. The load of the piece of furniture to which the caster is attached is supported on bearing surface 30 of the dished disc 16, along which the disc 16 frictionally engages the caster body 12. (see FIG. 3). The point of intersection of the plane on the bearing surface 30 with the axis 26 is designated as the bearing point 32 in the following discussion.

Figure 4:
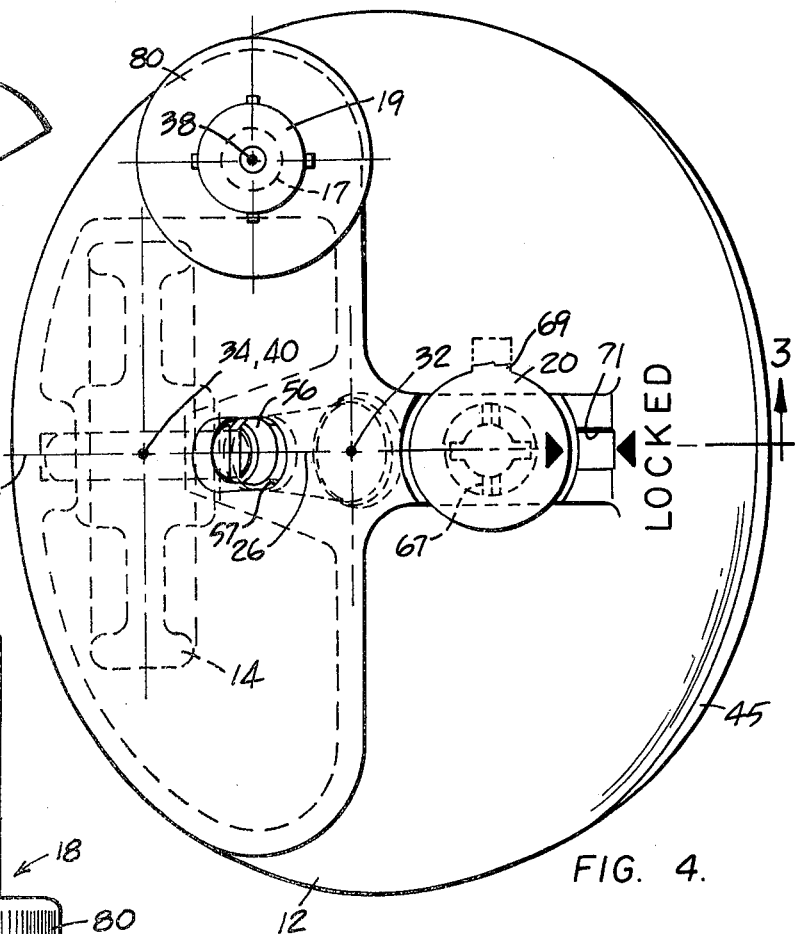
FIG. 4 is a plan view of the caster of this invention.
Figure 3:
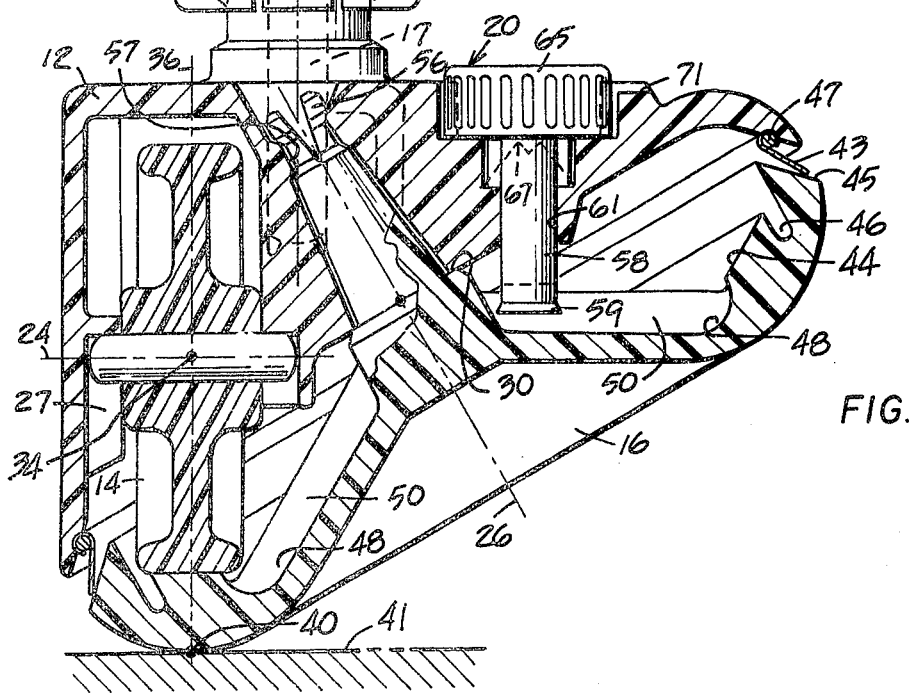
FIG. 3 is a vertical sectional view along lines 3—3 of FIG. 4, with the shaft of the inclined disc partly unsectioned, showing the caster of this invention is assembled relationship with the locking pin in locked position.

The assembled relationship of the parts is more clearly depicted in FIGS. 3 and 4. It will be particularly noted that the bearing point 32 is located in a horizontal plane higher than the axis 24 of the wheel 14. However, as shown in FIG. 4, the bearing point 32 lies in the same vertical plane (the sectioning plane 3—3 of FIG. 4) as does the center point 34 of the wheel 14, which is the point of intersection of the axis 24 with the vertical plane 36 which bisects the wheel 14. It will also be noted that the vertical axis 38 of stem pin 17 lies behind the sectional plane of FIG. 3, whereas the contact point 40 between the dished disc 16 and the carpet surface 41 lies in the sectional plane of FIG. 3 directly underneath the center point 34. It is, of course, this displacement of the stem axis 38 from contact point 40 which provides the castering action of the caster. The geometrical relationship of bearing point 32, and center point 34, and stem axis 38 is important to the functioning of the caster and will be described in detail hereafter in connection with FIG. 6.

FIG. 5 shows the details of dished disc 16 in accordance with this invention. It will be understood, of course, that the designation of element 16 as a "disc" for convenience only and is not meant to exclude from the invention any equivalent elements whose shape may be different but which perform the same function in the same environment. The disc 16 has a curved carpet-contacting surface 42 whose radius is made sufficiently large to minimize the tendency of the caster to form a depression in the carpet or its padding when the piece of furniture to which the caster is attached remains in place for a long period of time. On the inside of the dished disc 16, an annular track surface 44 is provided to support the wheel 14 when the caster 10 is assembled. The angle of inclination of the track surface 44 is preferably such that in the assembled condition of the caster the track surface 44 is horizontal at the point where it is contacted by the rim of the wheel 14. (see FIG. 3)

It has been found that when this type of caster is used on carpets, a lint accumulation tends to take place on the track surface 44, and thus eventually interferes with the proper running of the wheel 14 on the track surface 44. To overcome this problem, a thin flexible sealing skirt 43 (FIG. 3) may be provided to form a wiping seal in conjunction with the inclined surface 45 of disc 16. The skirt 43 is held in place in bearing block 12 by snap ring 47. In addition, the disc 16 is provided with lint-receiving slots 46 and with cavities 48 separated by radial fins 50 (see FIGS. 5 and 1). These slots and cavities narrow the track surface 44 to such an extent that it is just wide enough to receive the rim of the wheel 14. As a result, any lint clinging to the sides of the wheel 14 tends to be deposited in the slots 46 and the cavities 48, from which it can be cleaned out from time to time by unsnapping the dished disc 16 from the caster body 12. In addition, slots 52 may be formed in the center of the track surface 44 to catch lint accumulation on the track surface 44 itself.

The slots 46, 52 and the cavities 48 have the further advantage of preventing deformation of the rack surface 44 during the cooling of the disc 16 when it is molded at elevated temperatures in a forming die.

For easy removal from the bearing block 12, the dish 16 is provided with a tapered shaft 54 which terminates at its upper end in a split collar 56 whose resiliency permits the disc 16 to be snapped into position for rotation in the corresponding receiving collar 57 formed in the bearing block 12 (see FIG. 3). This construction allows the caster to be readily disassembled for cleaning without tools, merely by pulling the dished disc 16 away from the body 12 or by inserting a coin between the disc 16 and the body 12 and prying them apart.

For the same reason, the bearing pin 25 of wheel 14 also snaps out of the body 12 so that the wheel 14 can be removed from the body 12 for cleaning by merely pulling it downward. This is accomplished by journalling the bearing pin 25 (which may, if desired, be formed integrally with the wheel 14) in a vertical slot 27 whose width is narrowed to slightly less than the diameter of pin 25 just below its upper end, so as to allow the pin 25 to snap-fit into its operating position.

Inasmuch as the axis 26 of the disc 16 is inclined when the caster is assembled, a portion of the weight of the furniture to which the caster is attached is borne by the tapered surface 54. However, a substantial part of the loading of the caster on impact loads is borne by the bearing surface 30.

As will hereinafter be explained, the bearing surface 30 is an important element in the configuration of the disc 16, as the intersection of its plane with the axis 26 of the disc 16 determines the location of bearing point 32.

The fins 50 not only have a strengthening function, but they also cooperate with the shank 58 of locking pin 20 which is shown in locked position in FIG. 3 and in unlocked position in FIG. 3a. In the former condition, shank 58 protrudes into cavity 48 between fins 50 and prevents rotation of disc 16. The bottom end 59 of shank 58 is flared outwardly and slotted at 60. This construction causes the end 59 to resist withdrawal into locking pin opening 61 of block 12 as the bottom edge 63 of locking pin head 65 is drawn over ridges 67 of block 12 during movement of the locking pin 20 between the locked and unlocked positions, thereby preventing accidental locking or unlocking due to vibration. The locking pin 20 may be provided with a removal tab 69 (FIG. 3a) cooperating with a slot 71 in block 12 to hold the locking pin 20 in the unlocked position if desired.

The angle of inclination of the disc 16 is important to the particular use to which the caster 10 is to be put. Basically, the smaller the angle of inclination, the greater the apparent diameter of the caster will be as it rolls over depressions or obstacles. On the other hand, the smaller the angle the less the caster's tracking or castering ability becomes. The proper compromise between these factors depends on the type of furniture involved. For heavy furniture which is infrequently moved (e.g. beds, sofas, large overstuffed chairs, and the like), the paramount consideration is that the heavy object be easy to set in motion, and that the caster have a low, inconspicuous profile. Therefore, it is more important for the caster to climb easily out of the depressions it makes in the rug than it is for the caster to track properly, particularly when the piece of furniture is movd with a pulling or pushing motion by a person standing on the floor.

On the other hand, an ordinary chain such as a desk chair is ordinarily moved by the user while sitting in it and pushing against the floor or a desk with his feet or hands. In this application, tracking ability (or more exactly, uniform castering of the casters as a set) is paramount so that the chair will accurately move in the direction in which it is pushed. Climbing ability and profile are secondary, by the same token, because the constant movement of the chain and its relatively light weight prevent indentations from being a significant problem, and because visible casters are an integral part of desk chain design.

Although the foregoing considerations would appear to dictate the lowest possible angle of heavy furniture and the highest possible angle for chairs, limits are set on the low side (about 10°) by eventual failure of the the caster to turn at all, and on the high side by design limitations for a given caster size and by the eventual (beyond about 35°) tendency of the lower bearing block edge to cut into the carpet pile and to damage the carpet, as well as to interfere with the castering action.

It has been found that the preferred angle for use on heavy furniture such as beds, sofas, etc. ranges between 10° and 25°, with an optimum at about 15°. By contrast, the angle of inclination range for desk chairs or the like lies between 20° and 35°, with about 30° being optimum.

Turning now to FIG. 6, the proper functioning of the caster as a carpet caster requires a specific geometric relationship between the bearing point 32, the center point 34 and the axis 38 of the stem pin 17. If this relationship is not satisfied, the caster fails to roll and instead tends to drag across the carpet. Keeping in mind the fact that the bearing point 32 is in a different horizontal plane than the center point 34, it will be noted in the following description that the preferred location of the stem axis 38 varies as the angle of inclination of disc 16 is changed.

In the plan view of FIG. 6, the horizontal projection of the distance between the bearing point 32 and center point 34 is designated as $a + b$. The distance $a$ and $b$, respectively, lie on opposite sides of a verticl plane 62 which includes the axis 38 and is perpendicular to the vertical plane 64 which includes bearing point 32 and center point 34. It has been found that for proper rolling of the caster 10, the plane 62 must be located within the middle third of the distance $a + b$, and that the axis 38 should be no closer to the plane 64 than point 66 at which the triangle formed by points 32, 34 and 38 is equilateral, and no farther from plane 64 than point 64 than point 68, at which the plane 62 intersects the outer edge 70 of the caster body 12. The optimum position for axis 38 is the position in which $a = b$ (the triangle formed by points 32, 34 and 38 is isosceles) and in whih the axis 38 is half-way between points 66 and 68. This preferred location is the center of the rectangle ABCD of FIG. 6.

FIGS. 7 through 12 illustrate a feature of the caster of this invention which allows the caster to be used as a replacement for most types of standard casters by merely replacing the inexpensive stem assembly 18. As is best shown in FIG. 7 the stem assembly 18 consists of an interchangeable stem cap 19 into which is press-fitted a reinforcing steel needle bearing forming the stem pin 17. The pin 17 is rotatably supported on a nip 72 whose surface is kept as small as possible to provide as near a point contact with the pin 17 as is compatible with the required load bearing capacity of the caster. The reason for this construction is that when the caster is used on a hard surface instead of a carpet, the area of frictional contact between the dished disc 16 and the surface is very small. In order for the caster to roll and track properly, rather than slide, the area of frictional contact between the stem pin 17 and the body 12 (i.e. the surface of nib 72) should be even smaller.

Figure 10:
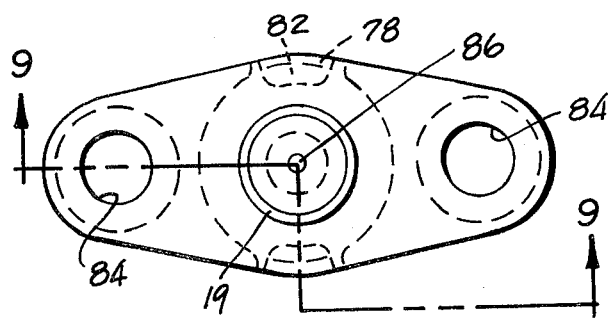
FIG. 10 is a plan view of the stem cap of FIG. 9.
Figure 9:
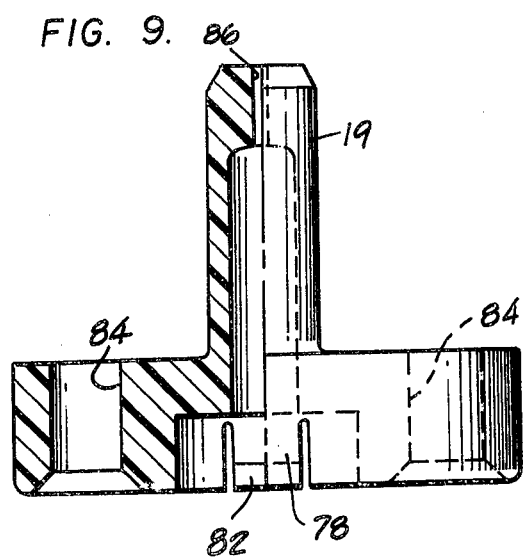
FIG. 9 is a sectional view of an alternative type of stem cap along line 9—9 of FIG. 10.

The stem assembly 18 can be attached to the caster body 12 by snapping the resilient jaws 78 of the shroud portion 80 of the stem cap 19 over the collar 22 formed on the bearing block 12. Although, as shown in FIG. 8, the inwardly directed flanges 82 (FIG. 7) may be provided on each jaw 78, they are preferably omitted (see FIGS. 10–12) on all but two portions of the jaws 78 in which the jaws are thinned to provide more flexibility for easier snap action. As shown in FIGS. 9 and 10, screw mounting holds 84 for possible screw attachment of the caster to the piece of furniture may be provided on stem cap 19. This construction also permits the stem cap 19 to be pushed off the forming die bottom during the molding operation with a minimum of mechanical problems. An air passage 86 is always provided in the top of stem cap 19 to allow press-fitting of pin 17.

Figure 11:
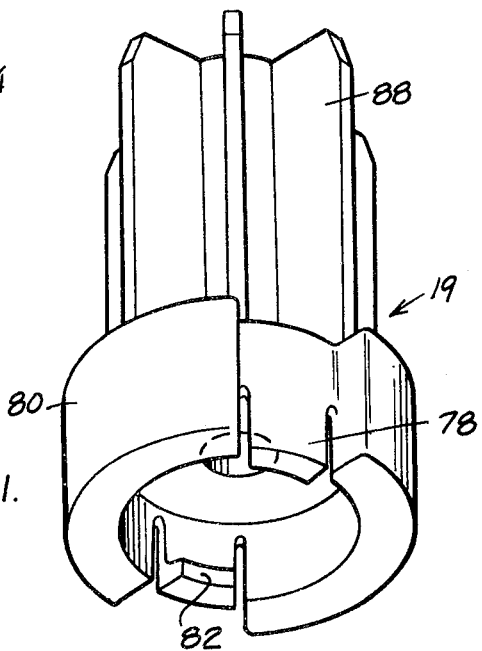
FIGS. 11 and 12 are perspective views of still other illustrative alternative types of stem caps.
Figure 12:
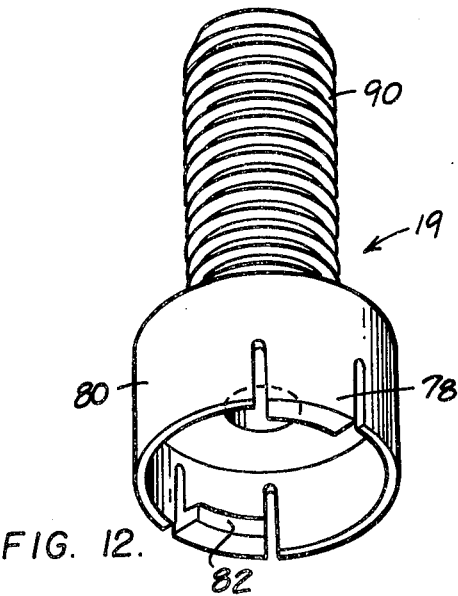

As shown in FIGS. 7 through 12, the stem portion of cap 19 can be shaped in various ways (e.g. with compressible or shearable press-fitting ridges 88, FIGS. 7, 8 and 11, or with screwthreads 90, FIG. 12) to accommodate various types of sockets without departing from the manner of functioning described herein. It will be seen that this construction makes it possible to readily adapt the caster at small expense to any desired type of stem socket.

What is claimed is:

1. A universal stem for casters having a caster body including an annular collar formed thereon, and having a bearing surface formed therein, said stem being arranged to be mounted to a receiving socket in an object to be castered comprising:
   a. a stem cap having a stem portion adapted to engage said socket, and a shroud portion adapted to loosely fit over said collar for rotation thereabout; and
   b. a pin-type bearing member extending axially through said stem cap and into said caster body when said caster is assembled, said bearing member rotatably bearing at one of its ends against said bearing surface in a substantially point contact relationship to permit free rotation of said caster body with respect to said stem;
   c. said shroud portion having resilient jaws equipped with flanges adapted to be snapped over said collar to prevent said stem cap and caster body from separating under the influence of gravity.

2. The universal stem of claim 1, in which said bearing member is fixed with respect to said stem cap but journaled for rotation in said body.

3. The universal stem of claim 1, in which said resilient jaws of said shroud portion are substantially thinner than the remainder of said shroud portion.

4. A caster comprising:
   a. a caster body having an annular collar formed thereon and a recessed surface formed therein; and
   b. a stem arranged to be mounted to a receiving socket in an object to be castered;
   c. said stem cap having a stem portion adapted to engage said socket, and a shroud portion adapted to loosely fit over said collar for rotation thereabout; and
   d. a pin-type bearing member extending axially through said stem cap and into said caster body when said caster is assembled, said bearing member rotatably bearing at one of its ends against said bearing surface in a substantially point contact relationship to permit free rotation of said caster body with respect to said stem; and
   e. said shroud portion having resilient jaws equipped with flanges adapted to be snapped over said collar to prevent said stem cap and caster body from separating under the influence of gravity.

* * * * *